United States Patent [19]

Hribar

[11] Patent Number: 4,840,031

[45] Date of Patent: Jun. 20, 1989

[54] CONTROL SYSTEM FOR FLUID PRESSURE OPERATED ACTUATOR

[75] Inventor: Frank Hribar, Kirtland, Ohio

[73] Assignee: Fluid Regulators Corp., Painesville, Ohio

[21] Appl. No.: 47,032

[22] Filed: May 5, 1987

[51] Int. Cl.$^4$ .............................................. F16D 33/00
[52] U.S. Cl. ..................................... 60/338; 60/493; 91/431; 91/446; 91/448; 91/461; 91/464; 137/115; 137/625.18
[58] Field of Search ................. 60/493, 338; 91/431, 91/444, 446, 448, 461, 464, 466; 137/625.18, 625.61, 625.64, 625.66, 115; 251/41

[56] References Cited

U.S. PATENT DOCUMENTS

| | | | |
|---|---|---|---|
| 2,368,754 | 2/1945 | Ernst | 137/115 X |
| 3,604,446 | 9/1971 | Brooks | 137/115 |
| 3,835,647 | 9/1974 | Huffman | 60/493 X |
| 3,856,047 | 12/1974 | Takayama | 137/625.61 |
| 4,314,502 | 2/1982 | Brinkel et al. | 91/464 X |
| 4,456,025 | 6/1984 | Childs | 137/115 |
| 4,718,329 | 1/1988 | Nakajima et al. | 91/461 X |

OTHER PUBLICATIONS

"Shock Suppressor" by Racine Hydraulics & Machinery Inc., Apr. 1965.

*Primary Examiner*—Edward K. Look
*Attorney, Agent, or Firm*—Watts, Hoffmann, Fisher & Heinke Co.

[57] ABSTRACT

A control system for an actuator used to position a control surface on an aircraft such as a horizontal stabilizer, including a source of pressurized fluid, a pressure control for establishing a predetermined pressure level that is substantially one-half source pressure, a blocker valve and at least one direction control valve for controlling the application of fluid pressures to the actuator. During idle periods, the blocker valve supplies substantially equal control pressures to the actuator so that the control system remains pressurized to substantially one-half source pressure. When the actuator is being energized, the direction control valve determines the direction of actuation and the blocker valve controls the fluid flow rate to and from the actuator to maintain a constant actuation rate regardless of load. A servo pressure a regulator monitors return flow across an orifice and adjusts the position of a blocker valve element in order to throttle both the input and return fluid flows to the actuator as a function of the return fluid flow rate so that movement in the actuator is effectively controlled even under overhauling loads.

21 Claims, 6 Drawing Sheets

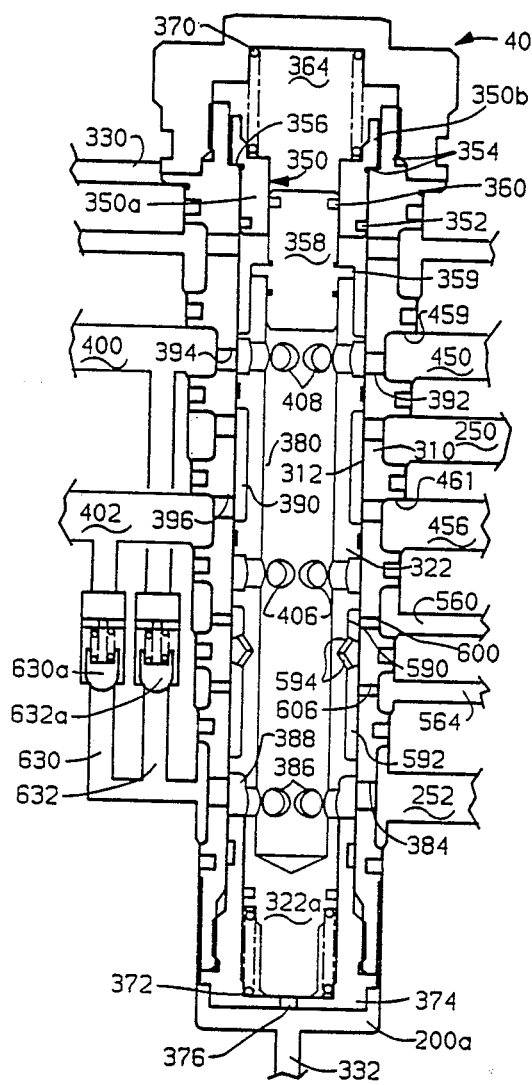
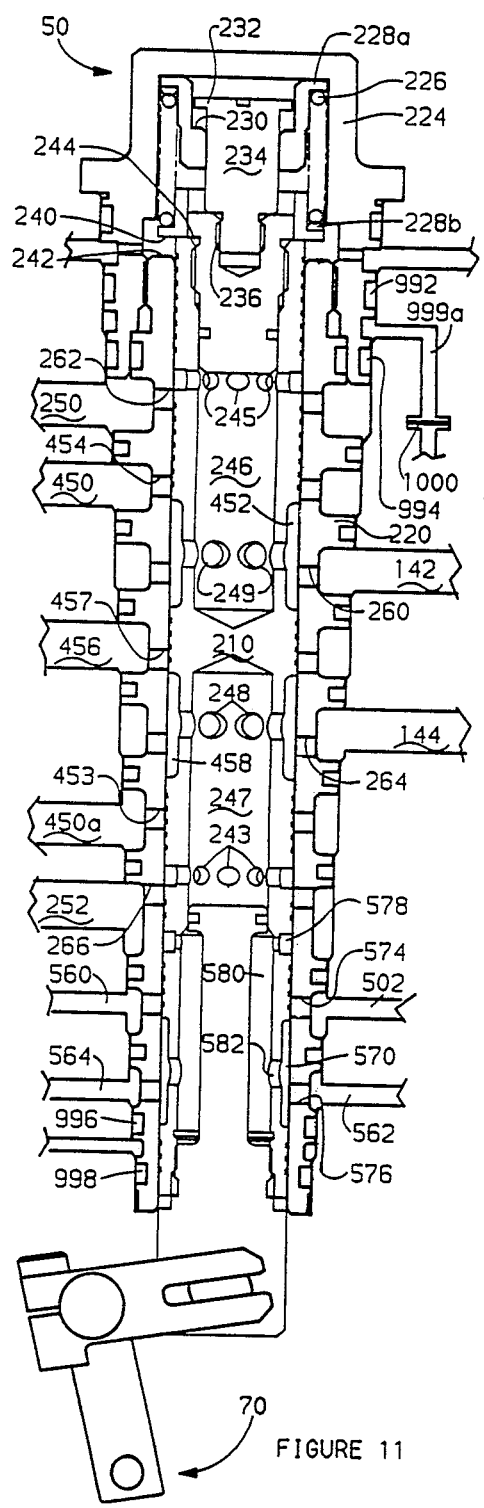
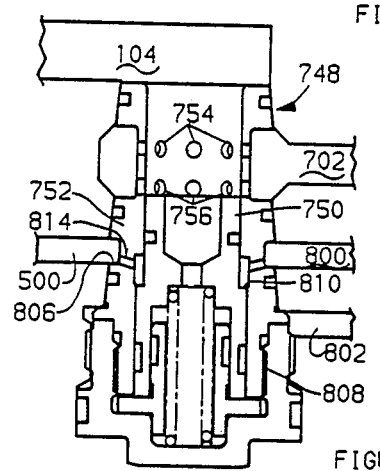
FIGURE 5
FIGURE 10
FIGURE 11

CONTROL SYSTEM FOR FLUID PRESSURE OPERATED ACTUATOR

TECHNICAL FIELD

The present invention relates generally to fluid pressure operated control systems and in particular to a control system for controlling a fluid pressure operated actuator used to adjust the position of control surface on an aircraft.

BACKGROUND ART

Most aircraft have both a "flight control" and a "trim control" system. The flight control system is used to maneuver the aircraft during flight, i.e. to make course changes, etc. whereas the trim control system is used to adjust the flying characteristics of the aircraft. In large aircraft, both systems are fluid pressure operated. Controls operated by the pilot control the application of fluid pressure to an actuator that is attached to the control surface being adjusted or moved. These control surfaces may include ailerons, the horizontal stabilizer and the vertical stabilizer.

Most flight control systems used today are modulating type systems in which some fluid pressure is always applied to the actuator attached to the control surface. Positional changes are made to the control surface by altering the pressure differential applied to the associated actuator. As a result these systems are considered to be continuous duty systems since during flight, the components of the system are continually stressed by at least a minimum fluid pressure level. Many of these systems include feedback arrangements to provide more precise control and in some instances the control system forms part of an autopilot system so that fully automated flight can be obtained.

The trim control system of an aircraft on the other hand, is considered an intermittent duty system, since it is used to periodically adjust the aircraft's flight characteristics. The adjustments may be made in order to compensate for aircraft flight control loads that occur in response to changes in speed, attitude, load and/or changes in drag resulting from actuating the landing gear, flaps and other external aircraft surfaces. The system typically controls the horizontal stabilizer; slight adjustments to its position change the overall flying attitude of the plane. Since in the past it was believed that adjustments to these control surfaces were done only infrequently during flight, the control systems for controlling these surfaces was not of the modulating type.

A typical control system for a horizontal stabilizer is simple in nature and can be termed as a "bang-bang" system. When a change in the position of the control surface is desired, fluid pressure is applied to the associated actuator to cause its rotation and attendant movement in the surface. After the movement is completed, the actuator is completely depressurized. A mechanical brake is used to lock its position. In a typical control system for a large aircraft, the pressure applied to the actuator can be in the range of 3,000 psi. As a result, the components forming part of the control system are abruptly cycled between 0 and 3,000 psi whenever the system is activated. This large and sudden pressure fluctuation places the components under substantial stress.

It has been found recently, that contrary to what was believed in the past, in some aircraft the trim control system is activated by the pilot at a higher than expected frequency. This is especially true in large military aircraft that are capable of being refueled in flight. As the aircraft is being refueled, the pilot must make continual trim changes to the aircraft to compensate for the changes in aircraft weight and center of gravity that occur as the fuel is being delivered. Changes in aircraft weight that cause changes in flight characteristics also occur as a result of fuel consumption. Failures in the trim control system have been occurring at a rate that is undesirable. It is also believed that simply replacing a conventional trim control system with a sophisticated modulating system as is used for flight control system would be prohibitably expensive.

Disclosure of the Invention

The present invention provides a new and improved actuator control system that is especially adapted to control the position of control surfaces on an aircraft that are used to trim or adjust flight characteristics during flight. The disclosed control system provides advantages normally associated with modulating type flight control systems, i.e., lower component stress level fluctuations, without the attendant high cost and complexity.

In the preferred embodiment, the control system includes at least one directional control valve for determining the direction of actuation of the actuator, a blocker valve for controlling the rate of flow and the communication of pressurized fluid to the actuator and a pressure control arrangement for providing pressurized fluid at a controlled pressure level. The pressure controlling arrangement in connection with the blocker valve causes substantially equal fluid pressures to be applied to all actuator ports during system inactivity. In the preferred embodiment the pressure level is substantially one-half source pressure and all components and passages associated with the actuator are maintained at substantially one-half source pressure during flight, when the actuator is not changing position.

When the disclosed control system is used to control the movement in a conventional actuator connected to a control surface such as a horizontal stabilizer of an aircraft, the components forming part of the control system are subjected to substantially less stress fluctuation as compared to more conventional on/off systems. In particular, during inactive periods, the system remains pressurized to substantially one-half source pressure. When the actuator is being actuated, the fluid pressure level on one side of the actuator is raised above the inactive level and the fluid pressure on the other side of the actuator is reduced. As a result, the maximum pressure level excursion on either side of the actuator is one-half source pressure. In more conventional systems, as explained above, the fluid pressure on a component can vary between zero and source pressure. Consequently, the variation in stress levels on the components of the present invention are substantially less than that experienced on more conventional control systems.

According to a feature of the invention, the blocker valve not only controls the pressurization of the actuator during both active and inactive periods but also acts as a flow regulator to maintain substantially constant flow to the actuator so the rate of actuation remains substantially constant even though loads may vary. In the disclosed embodiment, both the pressurization and return flows are controlled so that the movement in the actuator can be precisely controlled even when subject to an overhauling load.

This feature is achieved by a servo pressure regulator which monitors the return fluid flow from the actuator. A controlled pilot pressure flow is established and is used to control movement in the blocker valve. The fluid flow rate in the pilot pressure circuit determines the position of the blocker valve. In the preferred and illustrated embodiment, the blocker valve includes an orifice which forms part of the pilot pressure circuit. The fluid flow rate from the orifice is controlled by a servo pressure regulator which operates to vent one side of the orifice to a return pressure passage. The rate at which the servo pressure control vents the down stream side of the orifice is dependent on the sensed flow rate of the return fluid leaving the actuator. The position of the servo pressure regulator and, hence, the rate of fluid flow across the blocker valve orifice is a function of the flow rate of return fluid. As the flow rate across the orifice increases, as force is applied to a valve element in the blocker valve to urge it towards an open position. As the flow rate across the orifice decreases which corresponds to an increase in the flow rate of the return fluid, the valve element moves to a position at which fluid flow to and from the actuator is throttled. With the disclosed arrangement, a hydraulic feedback loop is formed which maintains the actuation rate of the actuator substantially constant regardless of the load on the actuator. As the load increases, the blocker valve opens to increase pressure to the actuator. As the load on the actuator decreases, the blocker valve under the control of the servo pressure regulator, throttles fluid flow to and from the actuator.

According to a feature of the invention, the control system includes redundant manually operated and electrically operated trim valves. The actuation of either trim valve causes operation of the associated actuator and hence the control surface to which it is connected. Both trim valves are preferably hydraulically centered, three position valves. Movement of either valve (but not both) from a center position causes actuation of the actuator.

According to another feature of the invention, at least two different actuation rates for the actuator are provided. To achieve this feature, a flow rate selector valve is employed. The selector valve is positioned in the return fluid circuit and includes a two-position valve element. In one position of the valve element, one set of ports is disposed in the flow path. In a second position, additional ports are exposed so that the effective orifice size is increased. The servo pressure regulator monitors the pressure drop across the flow rate selector and adjusts the position of the blocker valve so that a constant flow across the orifice selector is maintained. Since a constant flow rate is manifested as a constant pressure drop across the orifice selector, the actual flow rate controlled by the servo pressure regulator is determined by the position of the control element in the flow rate selector.

The disclosed control system is capable of precisely controlling a fluid pressure operated actuator especially an actuator used to position an aircraft control surface. Unlike "on/off" or "bang-bang" systems, the control system of the present invention maintains pressurization of the overall system during inactive periods that is substantially one-half source pressure. When the actuator is being actuated, the control components are subjected to no more than a pressure level change of one-half source pressure consequently system fatigue life is substantially improved. In addition, the flow rate of fluid to the actuator is precisely controlled so that the actuation rate does not change even though loads can vary substantially on the control surface.

According to the invention, a surge suppressor is disclosed which responds to surges in source pressure above a predetermined level and operates to vent source pressure to a return line in order to relieve the surge. In the preferred embodiment, the surge suppressor comprises a housing defining a fluid chamber that communicates with source pressure through an orifice forming part of a piston-like valve element. The valve element controls the fluid communication between an inlet (which communicates with the source pressure) and an outlet that communicates with a return line. The value element is biased towards a flow interrupting position. The disclosed suppressor relies for its operation on the compressibility of hydraulic fluid in the control system.

In operation, source pressure is applied to fluid in the chamber through the orifice forming part of the piston. Because fluid in the chamber compresses as source pressure increases, fluid flow through the orifice occurs to compensate for the decrease in fluid volume in the chamber. If the increase in source pressure is gradual, the orifice in the valve element can support the fluid flow needed to fill the chamber as the fluid compresses. If the rate of increase in source pressure is above a predetermined level, the sudden flow across the orifice generates a force which overcomes the bias force normally exerted on the valve element and moves it towards an open position which communicates the inlet with a return line thus at least partially venting source pressure in order to relieve the surge. The disclosed surge suppressor responds only to a rate of pressure increase above a predetermined level and is totally unresponsive to gradual increases or decreases in source pressure. In the preferred and illustrated embodiment, the fluid in the suppressor chamber is the same fluid used throughout the system. A bleeding arrangement forms part of the suppressor which is used when the valve is first installed in order to remove air from the chamber so that it is completely filled with system fluid.

According to another feature of the invention, the manual trim valve includes a "all ports blocked" position which the spool passes through whenever it is moved from its center position to either of its shifted positions. With this feature, the application of fluid pressure to the actuator can be terminated even though a failure in the electrical trim valve or other component occurs. With this feature, a pilot can manually block the application of fluid pressure to the actuator even though a component failure has occurred in the control system.

Additional features will become apparent and a fuller understanding obtained by reading the following detailed description made in connection with the accompanying drawings.

BRIEF DESCRIPTION OF THE DRAWINGS

FIG. 5 is a sectional view of an electrical trim valve forming part of the control system, shown with a valve spool in one of two fully shifted positions;

FIG. 10 is a sectional view of a flow rate selector valve forming part of the control system; and, FIG. 11 is a sectional view of a manual trim valve forming part of the control system and shown with a spool in an "all ports blocked" position.

BEST MODE FOR CARRYING OUT THE INVENTION

Figure 1:
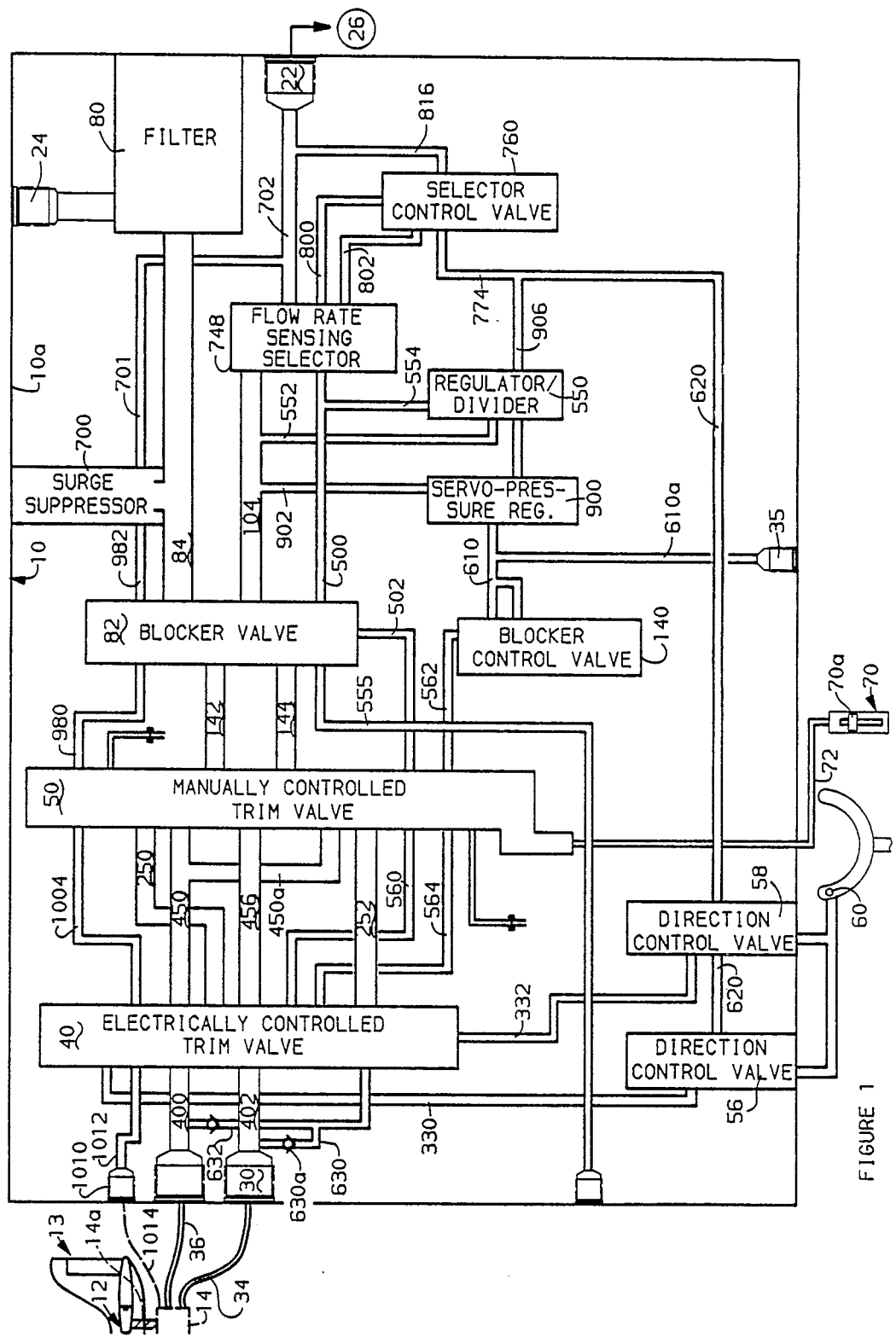
FIG. 1 is a block diagram, diagrammatically representing a trim control system for an aircraft horizontal stabilizer, constructed in accordance with the preferred embodiment of the invention.

FIG. 1 illustrates, somewhat schematically, a fluid control system 10 for controlling or trimming the position of a horizontal stabilizer 12 forming part of a tail 13 of an aircraft. The illustrated trim control system can be used to control the positioning of other control surfaces, such as aircraft flaps (not shown).

As shown schematically in FIG. 1, an actuator 14 is operatively connected to the horizontal stabilizer 12. The actuator 14 is actually located within the tail 13 of the aircraft. Typically, at least in large aircraft, the actuator 14 is fluid pressure operated and rotates a threaded shaft 14a operatively connected to a threaded element such as a nut located near the leading edge of the stabilizer. The stabilizer is raised or lowered depending on the direction of rotation of the shaft 14a. It should be noted that in some aircraft the actuator 14 drives the nut and another system such as the autopilot drives the screw 14a.

According to the invention, the control system 10 controls the communication of pressurized fluid to the actuator 14. In the preferred embodiment, the control system 10 includes a manifold, indicated schematically by the reference character 10a and a plurality of valves attached to and/or forming part of the manifold. In the illustrated embodiment, the various valves are cartridge assemblies and are threadedly received in bores formed in the manifold 10a.

The manifold 10a includes a port 24 for receiving pressurized fluid from a source, a discharge port 22 communicating with a tank or reservoir 26 and a pair of actuator ports 30, 32 which communicate with associated ports on the actuator 14 by way of conduits 34, 36. By selectively communicating pressurized fluid to either of the ports 30, 32, the actuator 14 can be driven in a selected direction. When both ports are pressurized with equal pressures, the actuator is held in position by a spring loaded brake (not show). Whenever a pressure differential exists between the ports 30, 32, the brake is released and the actuator will be driven accordingly. A brake port 35, the function of which will be described, is provided for releasing the brake under predetermined conditions.

In accordance with the invention, during aircraft operation, the ports 30, 32 are maintained at a substantially equal, predetermined idle pressure when the actuator is not being operated by the pilot. During movement of the aircraft control surface 12, one of the ports 30, 32 will be at a pressure somewhere between the predetermined idle pressure and zero whereas the other port will be at a pressure between the predetermined idle pressure and a maximum source pressure. The differential established between the ports 30, 32 determines the force exerted by the actuator 14 on the control surface 12.

The pressures at the ports 30, 32 during trimming operations, are determined by electrically controlled and manually controlled redundant trim valves 40, 50. The electrically controlled trim valve 40 is controlled by a pair of solenoid operated direction valves 56, 58. The actuation of these solenoid valves is achieved through one or more electrical switches 60 forming part of the pilot control (only one switch is illustrated). In operation, when the switch is moved in one direction, i.e., upwardly, one of the solenoid valves 56, 58 is actuated. When the solenoid valve 56 is energized and (provided other valving is in the appropriate position, which will be described later), the electrically controlled trim valve 40 is actuated and increases the fluid pressure at the port 32 and decreases the fluid pressure at the port 30. The resulting pressure differential causes movement in the actuator 14 in one direction. When the solenoid valve 58 is energized, the pressure at the actuator port 30 increases and the pressure at the port 32 decreases. The resulting pressure differential produces reverse movement in the actuator 14.

Upward movement of the switch from a center position energizes one of the solenoid valves 56, 58 whereas downward movement energizes the other solenoid valve. In the neutral or center position of the switch 60, neither solenoid valve 56, 58 is energized.

The manual trim valve is operated through a slide control 70 which is operatively connected to the valve 50 by a cable or other suitable connecting element 72. Movement of a slide lever 70a forward or aft (as viewed in FIG. 1) causes the appropriate one of the actuator ports 30, 32 to be pressurized to an increased pressure level while the other port is vented or depressurized. The resulting pressure differentials produce movement in the actuator 14 as described above.

As indicated above, source pressure is delivered to the input port 24. The pressurized fluid travels through a filter 80 removably mounted to the manifold 10a. From the filter, the fluid is delivered to a port on a blocker valve 82, the construction of which will be described later, by way of a passage 84. In normal operation, the fluid in the passage 84 is substantially at a source pressure $P_s$. In a typical aircraft application, source pressure $P_s$ is in the neighborhood of 3,000 psi. The invention, however, is not limited to a system operating at 3,000 psi.

Figure 2:
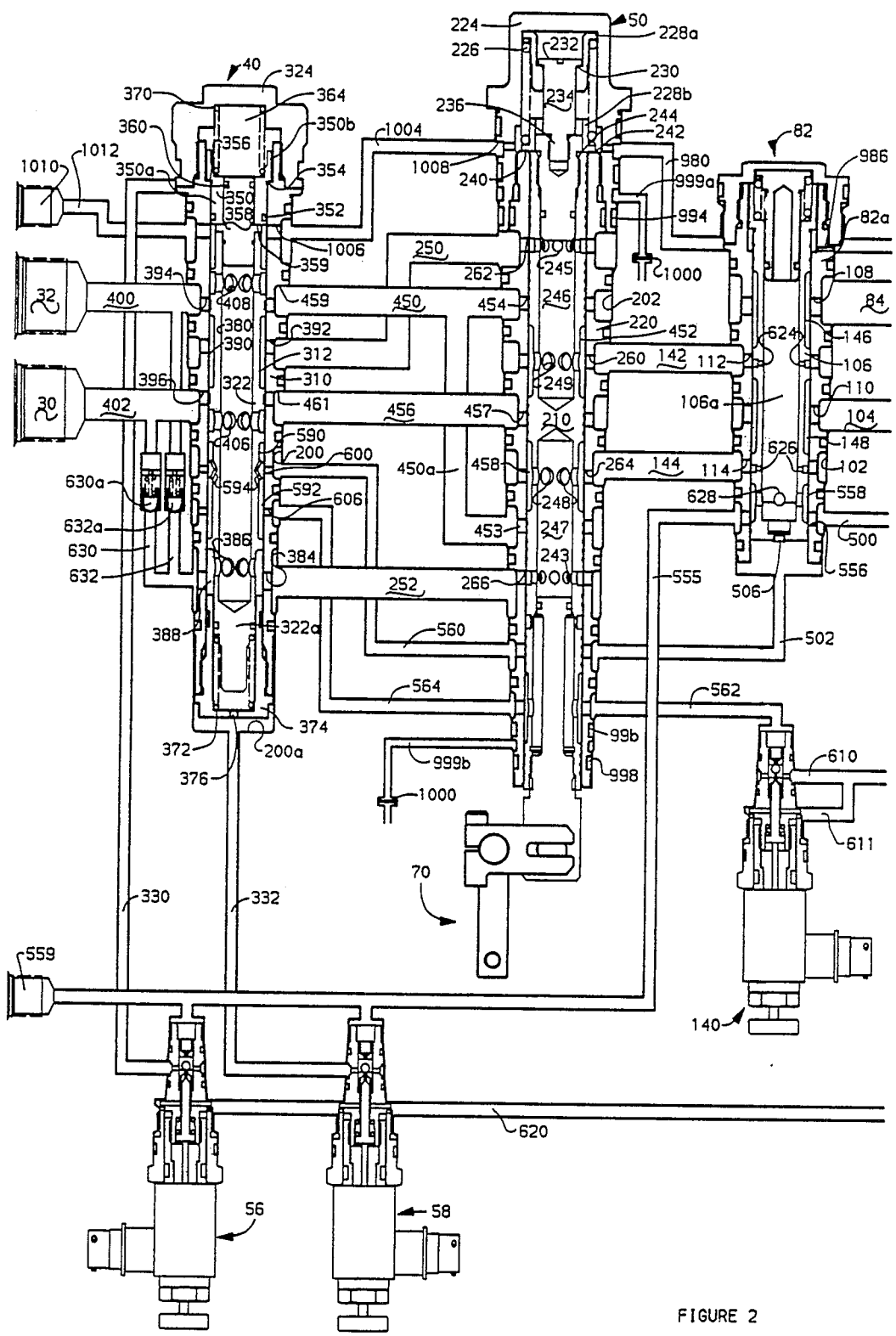
FIG. 2 is a fragmentary, schematic view of the control system shown in FIG. 1.
Figure 3:
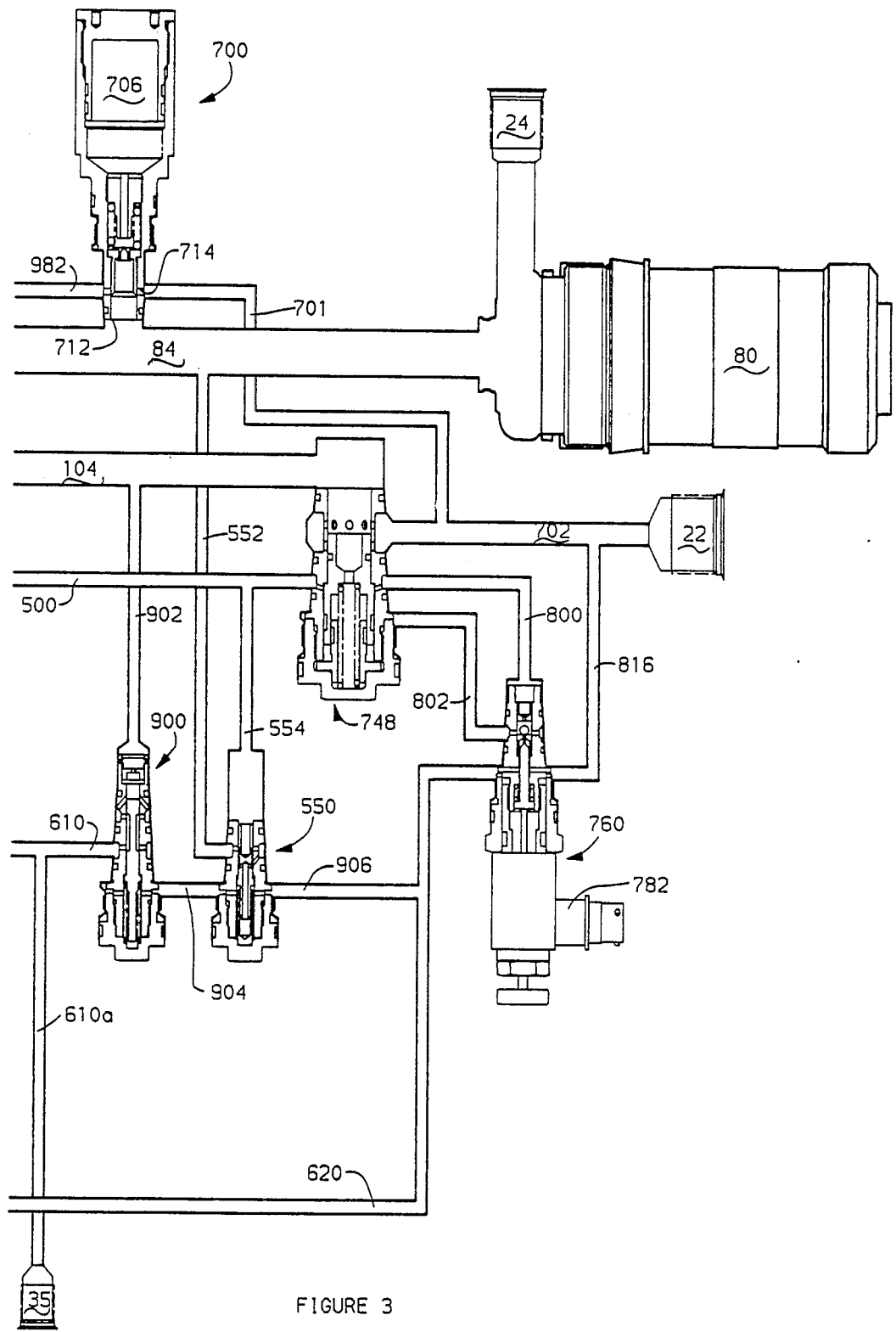
FIG. 3 is a fragmentary, schematic view of another portion of the control system shown in FIG. 1.

Referring also to FIGS. 2 and 3, the constructional details of each of the valves used in the control system 10 will now be described. The blocker valve 82 provides several functions. Firstly, it isolates the manual and electrical trim valves 50, 40 to prevent inadvertant trim actuation when the trim control is inactive. Secondly, the blocker valve 82 controls the delivery of a predetermined fluid pressure to both actuator ports 30, 32 when the trim control is inactive during flight. In the preferred embodiment, during inactive times, approximately one half source pressure i.e., 1500 psi. is supplied concurrently to both actuator ports 30, 32.

In the preferred embodiment, the blocker valve 82 comprises a cartridge assembly that is received in a complementary shaped bore 102 formed in the manifold 10a. The cavity 102 communicates with the source pressure passage 84 and a return pressure line 104.

The cartridge assembly 82 includes a slidable spool 106 that controls the communication of a source pressure input port 108 and a return pressure input 110 port with associated pressure and return output ports 112, 114, respectively. The spool 106 is slideable in a blocker sleeve 82a.

The activation of the blocker spool is controlled by a blocker control valve 140. In the preferred embodiment, the blocker control valve is solenoid operated and is a three-way valve that is normally opened when the solenoid is unenergized. When the blocker spool 106 is in the position illustrated in FIG. 4, source pressure in the passage 84 is communicated to a first intermediate passage 142 via ports 108, 112 which are at least partially cross communicated by a clearance region 146 defined on the spool 106. The return pressure line 104 is communicated with a first intermediate return passage 144 via ports 110, 114 which are at least partially cross communicated by a clearance region 148. When the spool 106 moves to its upper position illustrated in FIG. 2, the source pressure port 108 and return pressure port 110 are isolated from the outlet ports 112, 114 and the associated feed passages.

The manual trim valve 50 and the electrically controlled trim valve 40 are disposed in a redundant relationship. In the disclosed arrangement, when the first intermediate pressure passage 142 and the first intermediate return passage 144 are communicated with the source pressure passage 84 and return pressure line 104 by the blocker valve 82, the operation of either the manual valve 50 or the electrically controlled valve 40, (but not both) will adjust or modify the fluid pressure level at the actuator ports 30, 32. In the preferred embodiment if the manual and electrically controlled valves 50, 40 are both activated, the manual valve controls.

Both the manual and electrically controlled trim valves 50, 40 are three position valves. The manual trim valve 50 is spring centered whereas the electrically controlled valve 40 is hydraulically centered with a secondary center bias provided by springs (to be described). Both valves are shown in their centered positions in the FIG. 2. Both valves are preferably cartridge assemblies and are received in associated cavities 200, 202 formed in the manifold 10a. The manual trim valve 50 includes a shiftable spool 210. As indicated above, changes in position of the spool are achieved by a cable coupled control 70 which is operated by the pilot. Operation of the control moves the spool 210 either up or down (as viewed in FIG. 1) from its centered position shown.

The manual trim valve 50 includes: a sleeve 220, the spool 210 which is slidable within the sleeve 220 and a cap 224 threadedly coupled to the sleeve 220. The mechanism for centering the spool 210 is located within the cap 224. In particular, a spring 226 is captured between a pair of spring seats 228a and 228b. The upper spring seat 228a (as viewed in FIG. 2) defines a shoulder 230 against which a head 232 of a shoulder bolt 234 abuts. The shoulder bolt 234 includes a threaded segment 236 that is threadedly received by an upper end of the spool 210. When the spool 210 moves downwardly, the upper spring seat 228a is pulled downwardly by the shoulder bolt 234 thereby compressing the spring 226, generating a restoring force urging the spool towards its center position. The lower spring seat 228b includes an end face 240, a portion of which abuts an end surface 242 of the sleeve 220 and another portion of which abuts an end surface 244 of the spool 210. The force of the spring 226 urges the spring seat 228b against the end surface 242 of the sleeve 220. Should the spool 210 move upwardly (as viewed in FIG. 2), the lower spring seat 228b is also moved upwardly, compressing the spring 226 and again generating a restoring force urging the spool 210 downwardly towards its center position.

The spool 210 includes a pair of aligned, but isolated axial bores 246, 247. The bore 247 includes two sets of radial directed bores 248, 243 whereas the axial bore 246 includes two sets of radial directed bores 249, 245. The axial bores 246, 247 and the associated radial bores 243, 245, 248, 249 are arranged such that when the spool 210 is centered, a port 260 defined in the sleeve 220 is communicated with a port 262 and a port 264 is communicated with a port 266.

As seen best in FIG. 2, with the spool in its center position, the first intermediate pressure passage 142 is communicated to a second intermediate pressure passage 250 by way of the sleeve port 260, radial bores 249, axial bore 246, radial bores 245 and sleeve port 262. The first intermediate return passage 144 is communicated with a second intermediate return passage 252 by way of the sleeve port 264, radial bores 248, axial bore 247, radial bores 243 and sleeve port 266. Thus, with the spool 210 of the manual trim valve 50 centered, both the manual trim valve 50 and the electrically controlled trim valve 40 are communicated with the pressurized fluid in the source pressure passage 84 and both are in fluid communication with the return pressure line 104. In this condition, the actuation of either the electrically controlled trim valve 40 or the manual trim valve 50 will change or adjust the pressures at the motor actuator ports 30, 32 to effect energization of the hydraulic actuator 14 attached to the horizontal stabilizer 12. It should be noted here that with both the manual and electrically controlled trim valves 40, 50 in their centered positions, the flow of pressurized fluid from the source passage 84 to the actuator ports 30, 32 is blocked as well as the flow of pressurized fluid from the ports 30, 32 to the return pressure line 104.

Turning now to the construction of the electrically controlled trim valve 40, the valve comprises a valve assembly that is received in the cavity 200 formed in the manifold 10a. The assembly includes a sleeve 310 that sealingly engages the cavity 200 at spaced locations and a spool 322 that is reciprocally movable within an axial bore 312 formed in the sleeve 310. A cap 324 is threadedly received by the sleeve 310 and captures the spool 322 within the sleeve. As indicated above, the valve assembly 40 is a three-position, hydraulically centered valve. The spool 322 is shifted from its centered position (illustrated in FIG. 2), by the selective venting to return of pilot pressure in pilot pressure passages 330, 332. When the pilot passage 332 is vented a biasing force is exerted on top of the spool 322 (as viewed in FIG. 2) and forces it downwardly. When the passage 330 is vented, an upwardly directed force is generated on the spool 322 and shifts it to its upper position (as viewed in FIG. 2). In the illustrated embodiment, when the control system is inactive, substantially equal pilot pressures are maintained in the passages 330, 332. These pilot pressures hydraulically center the spool 322. This is achieved as follows. A centering piston 350 is located at the upper end of the valve assembly 40 and includes a portion 350a slidably received at the upper end of the sleeve bore 312. A seal 352 inhibits leakage between the two members. An enlarged portion 350b of the centering piston 350 defines a shoulder 354 which is engageable with a shoulder 356 defined by the sleeve. A plug 358 is received by the centering piston 350 and by an upper end of an axial bore 380 defined by the spool 322. The plug 358 includes a flange 359 that is captured between a lower end surface of the centering piston and a upper end face of the spool 322. Seal 360 inhibits fluid leakage between the centering piston 350, and the plug 358. When assembled, a sealed pilot pressure chamber 364 is defined between the cap 324 and the inside of the centering piston 350 and the upper end face of the plug 358.

Pilot pressure in the passage 330 develops a force on the centering piston 350 urging it towards abutting contact with the shoulder 356 of the sleeve 310. Pilot pressure in the passage 332 urges the spool 322 upwardly, driving the upper end face of the spool 322 into contact with the flange 359 of the plug 358. Since the effective pressure area at the lower end of the spool 322 (as viewed in FIG. 2) is about one-half of the effective pressure area of the centering piston 350, when the passages 330, 332 are substantially equally pressurized, the piston 350 is driven into contact with the shoulder 356 of the sleeve 310 and the spool 322 is driven upwardly into contact with the plug 358. In this position, the spool 322 is centered.

In the illustrated configuration, when 1500 psi. is applied to both ends of the spool 322, the spool is held against the centering piston 350 with a force of approximately 300 lbs. Biasing springs 370, 372 located at opposite ends of the spool, are used to hold the spool in the center position when the system is not pressurized. Spring 370 is selected to apply a larger force than the spring 372 so that the annular piston 350 is held against the shoulder 356 of the sleeve 310 which in turn maintains the center position of the spool.

In the illustrated embodiment, the lower spring 372 is captured by an apertured plug 374 that is threadedly received by the lower end of the sleeve 310. Pilot pressure from the pilot line 332, admitted to the lower end 200a of the manifold cavity 200 is communicated to the lower end of the spool 322 by a central aperture 376.

In the preferred embodiment, the plug 358, which includes an upper end slidably received by the centering piston 350, seals off the upper end of the axial, preferably drilled, bore 380 formed in the spool 322. In the position shown in FIG. 2, the bore 380 is communicated with the second intermediate return pressure passage 252 by a port 384 formed in the sleeve 310, by a plurality of ports 386 and an annular clearance region 388 formed by a narrowed section 322a of the spool 322. In this position, the internal passage or bore 380 is in effect communicated with the return pressure line 104 via the second intermediate return passage 252 and the first intermediate return passage 144. The internal passage 380 is always in communication with the second intermediate return passage 252 via the ports 386 and the clearance region 388 defined by the narrow diameter section 322a of the spool 322 irrespective of what position the spool 322 is in.

The change in pressures at the motor or actuator ports 30, 32 to effect motor rotation is accomplished as follows: If the electrical trim valve 40 is used to actuate the actuator motor 14 (see FIG. 1), the following operation takes place. As discussed above, the spool 322 is shifted from its center position by the selective venting to return of pilot pressures to the upper and lower ends of the spool via the pilot pressure lines 330, 332. The actual controls for changing the pilot pressures in these passages will be discussed later. Suffice it to say that at this point, in order to shift the spool 322 upwardly the pilot pressure in the passage 332 must be substantially higher than the pressure in the pilot passage 330. In the preferred embodiment, in order to shift the spool upwardly the pilot pressure in the passage 332 is maintained at substantially one-half system pressure i.e., 1500 psi. in a 3000 psi. system whereas the pilot pressure in the passage 330 is vented or communicated to return pressure which is substantially zero or at most a few hundred psi. As viewed in FIG. 2, when the spool 322 moves to its upper position, an annular clearance region 390 defined by the spool 322 communicates a port or ports 392 defined by the sleeve 310 with a port or ports 394 that communicate with a motor actuator feed passage 400. Concurrently, the motor port 30 is communicated with the return pressure line 104 by a motor feed passage 402 that is communicated with the second intermediate return passage 252 via one or more radial ports 406 that communicate with the internal cavity 380 defined by the spool 322. As indicated above, the internal cavity 380 normally communicates with the second intermediate return passage 252 regardless of the position of the spool 322. With the manual trim valve 50 centered, the second intermediate return passage 252 communicates with the first intermediate return passage 144 which in turn communicates with the return line 104 via the blocking valve 82.

As seen in FIG. 5, when the spool 322 is shifted downwardly (by venting the pilot pressure in the passage 332 while maintaining pressure in the pilot passage 330), the clearance region 390 defined by the spool 322 communicates system pressure to the motor passage 402 by way of one or more ports 396. The motor port 32 is communicated to the return line 104 via radial ports 408, the internal passage 380, the second intermediate return passage 252 and the first intermediate return passage 144. As explained above, the various passages are interconnected by the manual trim valve 50 and the blocker valve 82.

When the manual trim valve 50 is employed to adjust the horizontal stabilizer, the following action takes place. As described above, the manual trim valve 50 is operated by a cable linkage connected to a slide control 70 operable by the pilot. Just prior to actuating the manual trim control, the electrical trim valve 40, the manual trim valve 50 and the blocker valve 82 are in the positions shown in FIG. 2. In this condition, and as will be explained further on, the spool 322 in the electrical trim valve 40 is maintained at the centered position by the concurrent application of substantially equal pilot pressures in the passages 330, 332. To arm the control function (so that when either the electrical or manual trim valves are shifted off center, the actuator 14 will be energized), the solenoid 140 is de-energized in order to permit the blocker spool 106 to move downwardly to at least partially cross communicate the ports 108, 112 and the ports 110, 114 via clearance regions 146, 148, respectively. The actual fluid mechanism which causes the shifting in the blocker spool 106 will be described further on.

Figure 4:
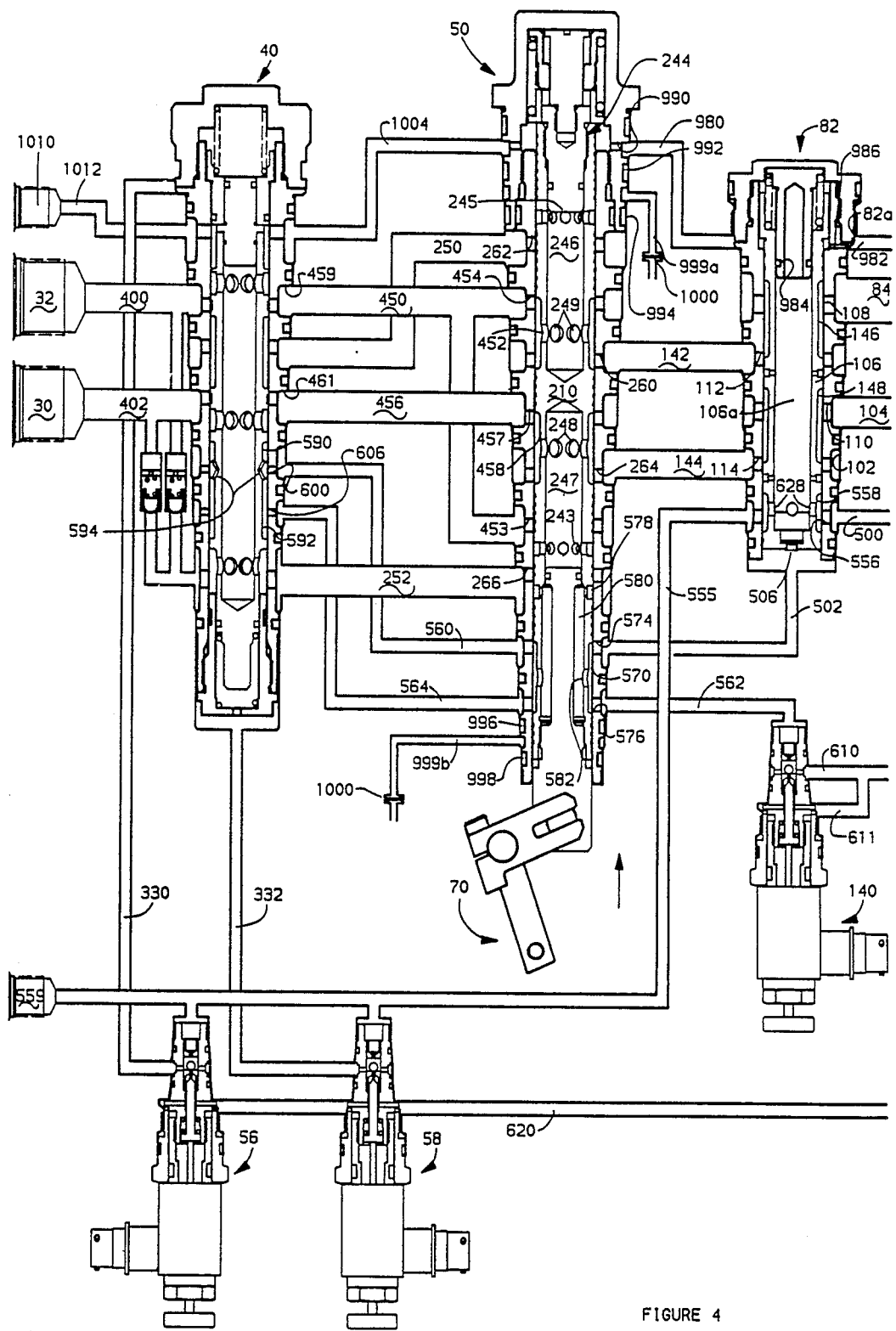
FIG. 4 is another fragmentary, schematic view of the control system shown in FIG. 2 with certain of the valves shown in different positions.

If the cable is operated to move the spool 210 upwardly (as seen in FIG. 4) in the trim valve 50 the following action takes place. The first intermediate pressure passage 142 is placed in fluid communication with an intermediate motor feed passage 450 by an annular clearance region 452 defined by the spool 210 which communicates the port 260 with a spaced sleeve port 454. At the same time, the second intermediate pressure passage 250 is isolated from the first intermediate pressure passage 142 because the ports 262, 245 are now misaligned. The first intermediate return passage 144 on the other hand, is communicated with a second intermediate motor feed passage 456 by a clearance region 458 defined by the spool 210 that in turn communicates with ports 457 formed in the sleeve 310. The second intermediate return passage 252 (which interconnects the manual and electrical trim valves 40, 50) is isolated from the first intermediate return passage 144 since the ports 266 formed in the sleeve 220 are misaligned with the radial bores 243 formed in the spool. As a result the motor actuator port 32 receives substantially source pressure $P_s$ from the pressure input passage 84 by way of the communicated blocker valve ports 108, 112, (see FIG. 4) the first intermediate pressure passage 142, the communicated ports 260, 454, the intermediate motor feed passage 450, an annulus 459 formed in the sleeve 310 of the electrically controlled trim valve and the motor feed passage 400. The motor actuator port 30 is communicated with the return pressure line 104 by the fluidly connected ports 110, 114, the first intermediate return passage 144, the fluidly connected ports 264, 457, the intermediate motor feed passage 456, an annulus 461 formed in the sleeve 310 of the electrically controlled trim valve and the motor feed passage 402.

When the spool 210 is shifted downwardly to pressurize the port 30, the clearance region 452 communicates pressure from the first intermediate pressure passage 142 to the intermediate motor feed passage 456. Concurrently, the intermediate motor feed passage 450 is communicated to the return 104 by way of a branch passage 450a which is communicated with the first intermediate return passage 144 by the clearance region 458 (which communicates the ports 264 with ports 453). The second intermediate return passage 252 is isolated again since the ports 266, 243 are misaligned. In short, when the spool 210 is moved downwardly, the motor port 30 is pressurized with substantially source pressure $P_s$ whereas the motor port 32 is maintained at the return pressure level in the return pressure line 104.

The selective application of pressure to the actuator ports 30, 32 by either the electrical trim valve 40 or the manual trim valve 50 will occur when the blocker valve 82 is in the position shown in FIG. 4. In the preferred embodiment, the blocker spool 106 is in a lower position such as shown in FIG. 4, only when the trim control system is actually being used to move the horizontal stabilizer 12. When the trim control system is inactive, the spool 106 is normally in the upper position shown in FIG. 2. In order to operate the horizontal stabilizer actuator 14 i.e., by selective application of pressures to the actuator ports 30, 32, the spool 106 must be shifted from the position shown in FIG. 2 to the lower position shown in FIG. 4. The position of the blocker valve spool 106 is controlled by pressures in a control pressure passage 500 and a blocker control passage 502. The spool 106 includes an orifice 506 mounted at the lower end of the spool. The upper side (as viewed in FIG. 2) of the orifice communicates with the control or regulated pressure in the passage 500 whereas the lower side of the orifice 506 communicates with pressure in the control passage 502. When a predetermined pressure drop exists across the orifice 506, the spool 106 will be urged towards a lower position (such as shown in FIG. 4). When substantially equal pressures exist in the regulated passage 500 and the control passage 502, the resulting lack of pressure drop across the orifice 506 will cause the spool to shift upwardly since the lower end of the spool 106 has a larger effective pressure area then the upper end of the spool. The unequal effective pressure areas create an unbalanced force condition on the spool 106 since pressures in the regulated passage 500 and the control passage 502 are equal. In short, a net fluid force is generated on the spool 106 that is directed upwardly when pressure in the regulated passage 500 and control passage 502 are substantially equal.

When the control passage 502 is communicated with the return pressure in the return pressure line 104 while pressure in the regulated passage 500 is maintained, the attendant pressure drop developed across the orifice 506 will cause the spool 106 to move downwardly into a lower position (such as shown in FIG. 4).

Figure 6:
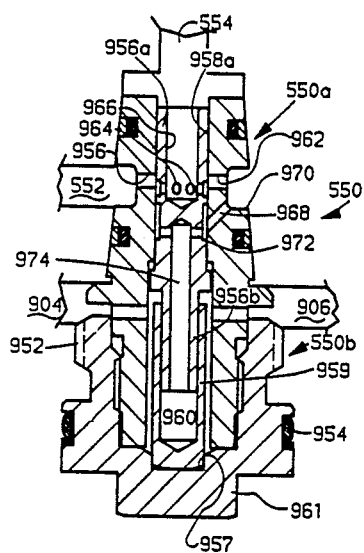
FIG. 6 is a cross-sectional view of a pressure divider forming part of the control system.

The components and circuitry for controlling the pressure drop across the orifice 506 is as follows. Referring to FIGS. 3 and 6, a pressure divider 550 communicates with the source pressure $P_s$ in passage 84 by way of a branch passage 552. The divider 550 reduces the source pressure and provides one-half of the source pressure to a passage 554. This pilot pressure is communicated to an intermediate pilot pressure passage 555 (see FIGS. 2 and 4) by way ports 556 formed in the blocker sleeve 82a and a clearance region 558 formed in the blocker spool 106. In the preferred and illustrated embodiment, the divider 550 provides a controlled pilot pressure to the passage 555 that is substantially one-half the source pressure. In a system operating at 3000 psi., the divider 550 would provide a pilot pressure of approximately 1500 psi. It should be noted here that the divider 550 can be replaced by a conventional pressure regulator which would be adjusted to provide substantially one-half source pressure to the intermediate passage 500. It is believed that for most applications a pressure divider is preferred. A gauge port 559 is provided for monitoring the control pressure in the passage 555.

The pilot pressure is communicated to the control passage 502 by the orifice 506. As seen in FIG. 2, the fluid pressure in the control passage 502 is communicated to the manual trim valve 50 as well as the electrical trim valve 40 by an intermediate pilot control passage 560. When the spool 210 in the manual trim valve 50 is in the centered position shown in FIG. 2, the communication of control fluid pressure in the control passage 502 is blocked from a branch control passage 562 that is connected to a lower region of the manual trim valve. Likewise, with the electrical trim valve in the centered position shown in FIG. 2, the intermediate control passage 560 is blocked from a intermediate pilot return passage 564. Consequently, with the manual and electrical trim valves 50, 40 centered as shown in FIG. 2, fluid pressure flow from the control passage 502 is blocked. As a result, the pressure in the control passage 502 is substantially equal to the pressure in the regulated passage 500, producing substantially equal pressures on both sides of the orifice 506 and causing the spool 106 to be maintained in the upper position shown in FIG. 2.

When either the manual trim valve or electrical trim valve are moved from their centered positions, the control passage 502 is fluidly communicated with the pilot return passage 562. Turning first to the manual trim valve 50, when the spool 210 is moved upwardly a sufficient distance (as seen in FIG. 4), an annular clearance region 570 formed in the spool is aligned with a port 574 communicating with the control pressure passage 502 and a port 576 communicating with the intermediate pilot return passage 562. As a result, fluid flow can proceed between the control passage 502 and the pilot return passage 562. When the spool 210 is moved downwardly a sufficient distance, the ports 574, 576 (and hence the passages 502, 562) are fluidly communicated by way of a radial port 578, an axial passage 580, another radial port 582 and the clearance region 570.

Turning now to the electrical trim valve, the spool 322 includes a pair of spaced apart, annular clearance regions 590, 592 which are interconnected by a plurality of drilled passages 594. As seen in FIGS. 2 and 5, radial ports 600 formed in the sleeve 310, which communicate with the intermediate control passage 560 are blocked by the spool 322. If, however, the spool is shifted upwardly, the clearance region 592 overlies the ports 600 as well as ports 606 communicating with the intermediate return passage 56 thus providing a flow path for fluid in the control pressure passage 560. If the spool 322 is shifted downwardly (shown in FIG. 5), the ports 600 and 606 are placed in fluid communication by the region 590, the passages 594 and the region 592. Movement in either the manual trim spool 210 or the electrical trim spool 322 will connect the control passage 502 with the intermediate pilot return passage 562.

The ultimate control of pressure in the pilot return passage 562 resides with the blocker control valve 140. In the preferred embodiment, this valve is a normally open, solenoid operated three-way pilot pressure valve. The valve controls the fluid communication between the first intermediate pilot return pressure passage 562 and an intermediate return passage 610. The control valve 140 also controls the pressurization of a branch passage 610a (shown in FIG. 3) which communicates with the brake port 35. Whenever the passage 610a is pressurized, a conventional mechanical brake (not shown) attached to the actuator 14, is released.

When the valve 140 is energized, flow between the passages 562, 610 is blocked and the blocker spool 106 is maintained in the upper position shown in FIG. 2 since the pressures across the orifice 506 are substantially equal (because flow from the control passage 502 is blocked). When the valve is de-energized, fluid flow can proceed between the passages 562, 610. However, the blocker valve spool 106 will not shift to the lower position shown in FIG. 2 until either the manual trim valve spool 210 or the electrical trim valve spool 322 are shifted a sufficient distance to communicate the the control passage 502 with the return passage 562.

As seen in FIGS. 2 and 4, the pilot pressure in the control pressure passage 500 is communicated to the solenoid operated direction valves 56, 58 via passage 555. The valves 56, 58 control the communication of fluid pressure in the passage 500 with respective pilot pressure passages 330, 332. In the preferred embodiment, the solenoid operated valves 56, 58 are normally opened so that when the valves are not energized, regulated pressure in the passage 500 is communicated to he pilot pressure passages 330, 332. As indicated above, when equal pilot pressures are present in the passages 330, 332, the spool 322 in the electrically controlled trim valve 40 is hydraulically centered. When the valve 56 is energized, pressure in the pilot pressure passage 330 is communicated with a pilot return line 620 and the pressure in the line 330 is vented and drops to the return pressure which is substantially zero or at most a few hundred p.s.i. With pressure in the pilot pressure line 332 at full pilot pressure i.e., 1,500 p.s.i., and the pressure in the pilot pressure line 330 being essentially zero, the spool 322 shifts upwardly. When the solenoid operated direction valve 58 is energized, pressure in the pilot pressure line 332 is communicated with the return line 620. With substantially full regulated pressure in the pilot pressure 330 and substantially zero pressure in the pilot line 332, the spool 322 is shifted downwardly. When both valves 56, 58 are de-energized, substantially equal regulated pressures are supplied in the pilot pressure lines 330, 322 and the spool 322 is hydraulically centered.

According to a feature of the invention, substantially equal fluid pressures are applied to both motor actuator ports 30, 32 when the control system is inactive, i.e. when the pilot is not trimming the stabilizer 12. As indicated above, the position of the blocker spool 106 is determined by the pressure differential established between the regulated input passage 500 and the control pressure passage 502. When substantially equal pressures are present in both passages 500, 502 the spool 106 is maintained in its upper position as illustrated in FIG. 2 because the effective pressure area of the lower end of the spool 106 is larger than the effective pressure area at the upper end of the spool. The spool 106 defines an axial bore 106a that forms an internal cavity. Two sets of radial ports 624, 626 communicate the internal passage 106a with the outside of the spool 106. When the spool is in a lower position as illustrated in FIG. 4, the ports 624, 626 are blocked.

As explained above, venting of the passage 502 by communicating the passage 502 with the pilot return 610 resides with the blocker control valve 140. The valve 140 is normally open and thus the passage 562 is normally in communication with the passage 610. During idle periods, the blocker control valve 140 is energized so that communication between the passage 562 and the return passage 610 is blocked. As a result, during inactive periods, the blocker spool 106 is maintained in its upper position. In this position and as best seen in FIG. 2, the ports 108, 110 are isolated since the clearance regions 146, 148 formed on the spool 106 are no longer aligned with the ports. The ports 112 and 114 are connected to the internal passage 106a by the ports 624, 626, respectively.

The radial ports 624, 626 are aligned with the first intermediate pressure passage 142 and the intermediate return passage 144, respectively. Pilot pressure from the pilot pressure line 500 is communicated to the internal passage 106a by radial bores 628. With the spool in this position, regulated pressure from the regulated passage 554 is communicated to both the intermediate pressure passage 142 and intermediate return passage 144 by way of the pilot passage 500, the bores 628, the internal passage 106a and the respective ports 624, 626.

During inactive periods, both trim valves 40, 50 have their respective spools 322, 210 in the center position shown in FIG. 2. With the spools in this position, the regulated pressure in the first intermediate return passage 144 is communicated to the motor actuator ports 30 and 32 by the fluidly communicated ports 264, 266, the second intermediate return passage 252, which is fluidly connected to passages 400 and 402 via feed passages 630, 632. The feed passages include check valves 630a, 632a which allow fluid flow to the actuator ports 30, 32 while preventing reverse flow (during energization of the actuator). As a result, during inactive periods, substantially equal, regulated pressure is concurrently applied to the actuator ports 30, 32. In the preferred embodiment, the regulated pressure is substantially one half source pressure so that in a 3,000 p.s.i. system, substantially 1,500 p.s.i. is concurrently applied to both motor actuator ports 30, 32.

With the present invention, although the system operates at 3,000 p.s.i., the maximum change in pressure applied to the components and the motor actuator is only 1,500 p.s.i. In particular, when the motor 14 is actuated to produce movement in the stabilizer 12, the pressure in one of the motor actuator ports increases from 1,500 p.s.i. to, at most, source pressure or 3,000 p.s.i. whereas the pressure in the other actuator port is vented or reduced to at most zero p.s.i. to produce a 3,000 p.s.i. differential across the motor. The 3,000 p.s.i. differential is required only at maximum actuator loads. These loads are variable and in pitch trim systems are a function of the location of the center of gravity and other flight dynamics. Loads well below maximum are normal. Therefore, the pressure differential is regulated at a fraction of the maximum by the blocker. At the conclusion of the trimming operation, 1,500 p.s.i. is reapplied to both actuator ports so that all components are continually stressed at a predetermined pressure level with the maximum excursion being only 1,500 p.s.i. during trimming operation. With this disclosed control system, it is believed that the service life of the components will be substantially increased since the stress levels on the components will be reduced in half as compared to a system which increases the pressure level at a given actuator port by 3,000 p.s.i. when the trim control system is activated and then vents the pressure level to substantially zero when the trimming operation is completed.

Figure 7:
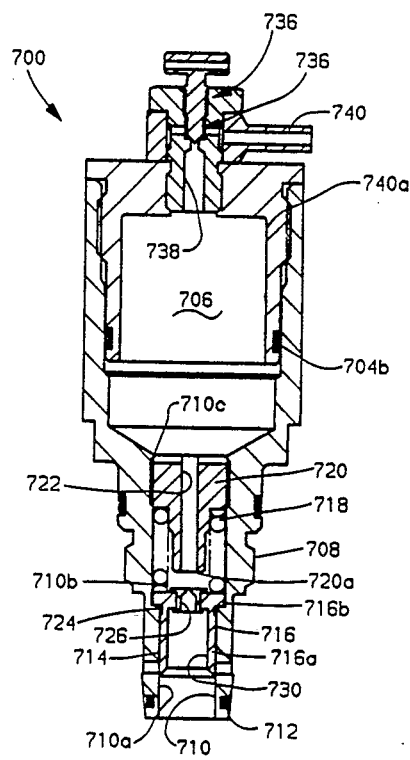
FIG. 7 is a sectional view of a surge suppressor constructed in accordance with the preferred embodiment of the invention.

Other features of the system include a surge suppressor 700 which operates to vent or partially vent pressure in the source passage 84 to the return pressure port 22 via branch passage 701 and main return passage 702 should a sudden surge in the source pressure be encountered. Referring also to FIG. 7, the suppressor includes a housing defined by threadedly connected members 704a, 704b. The members 704a, 704b each include an open end bore which together define a fluid chamber 706 when the members are assembled. The lower housing member includes a threaded segment 708 by which the suppressor 700 is threadedly mounted to the manifold 10a (shown in FIG. 1). The lower housing member 704b also defines a multi-stepped throughbore indicated generally by the reference character 710 which communicates a lower end opening 712 (defining an inlet) with the fluid chamber 706.

As seen in FIG. 3, the inlet 712 communicates with source pressure $P_s$ in the passage 84. The bore 710 includes a narrow diameter portion 710a, a larger diameter portion 710b, and a threaded section 710c. Radial bores 714 are formed in the lower housing and as seen in FIG. 3, communicate with the branch return passage 701. The communication of the bore 710 and in particular the narrow diameter bore portion 710a with the radial bore 714 is controlled by a piston-like valve member 716 which is slidably mounted in the bore 710. The piston 716 includes a narrow diameter section 716a which is sized to slidably fit within the narrow bore portion 710a and an enlarged diameter head portion 716b which is sized to slidably fit within the larger diameter portion 710b. The piston 716 is urged downwardly i.e., towards a position that interrupts fluid communication between the bore portion 710a and the radial bores 712 by a biasing spring 718 which acts between the head 716b of the piston and a plug 720 threadedly mounted to the threaded bore portion 710c. The plug 720 defines a throughbore 722 that communicates the bore portion 710b with the chamber 706. An end face 720a serves as an upper stop for the piston 716 preventing the piston from rising beyond a predetermined distance. A shoulder 724 defined between the larger and smaller diameter portions 710b, 710a cooperates with the piston head 716b and acts as a stop preventing the piston from moving downwardly beyond a predetermined distance. The piston 716 also defines an orifice 726 which in the illustrated embodiment comprises a rivet-like element mounted centrally in the piston. With the disclosed construction, operating characteristics of the surge suppressor can be altered by replacing the orifice element. In addition, the orifice element itself can be replaced should the element become worn.

In operation, source pressure in the passage 84 is communicated to the fluid chamber 706 by way of the housing bore 710a, an internal bore 730 defined by the piston 716, the piston orifice 726 and the throughbore 722 defined by the plug 720. When the surge suppressor is initially installed, and placed in operation, air trapped in the chamber 706 is bled by means of the needle valve assembly 736 which is operative to expose a passage 738 with a discharge nipple 740, enabling any air trapped in the chamber 706 to be removed.

The disclosed suppressor 700 relies on its operation on the compressibility of typical hydraulic fluid. As long as source pressure in the passage 84 remains constant, the fluid pressure at the inlet 712 is transmitted to the chamber 706 through the orifice 726 and plug bore 722. Should a sudden surge in source pressure occur in the passage 84, fluid will be forced to flow from the inlet 712 through the orifice 726 and into the chamber 706. The incoming fluid will compress the fluid in the chamber 706. The flow of higher pressure fluid through the orifice 726 will develope a biasing force on the piston opposing the biasing force exerted by the spring 718. If the flow rate through the orifice 726 exceeds a predetermined level, the fluid force developed across the orifice 726 will overcome the spring force and cause the piston 716 to move upwardly (as viewed in FIG. 7) at least partially exposing the radial ports 712 allowing fluid pressure at the inlet 712 to be vented to the main return line 702 via the branch passage 701. It should be apparent that the disclosed valve is sensitive to the "rate" of pressure increase. Gradual increases in pressure will not cause opening of the surge suppressor. Only fluid pressure surges over a predetermined level cause operation of the surge suppressor. The operating characteristics of the surge suppressor are determined by the volume of the chamber 706, the fluid used in the system, the size of the orifice 726 and the force applied by the biasing spring 718.

A mechanism for controlling the rate of actuation of the motor 14 is also provided. In particular, a flow sensing valve 748 is disposed between the return pressure line 104 and the main return 702. Referring to FIGS. 3 and 10, the valve 748 includes a shiftable spool 750 located in a sleeve 752. The sleeve includes two sets of radial ports 754, 756. When the spool 750 in its upper position as shown in FIG. 3, the fluid in the return passage 104 travels to the main return passage 702 through the ports 754. When the spool is shifted to its downward position (as shown in FIG. 10), fluid in the return passage 106 flows to the main return passage 702 through both sets of ports 754, 756. Greater flow is allowed to proceed to the main return line 702 when the spool 750 is in the lower position. The greater return flow then allows a greater flow rate through the actuator ports and as a result the actuator 14 is driven at a higher rate. The position of the spool 750 is controlled by a solenoid operated three-way valve 760.

Figure 8:
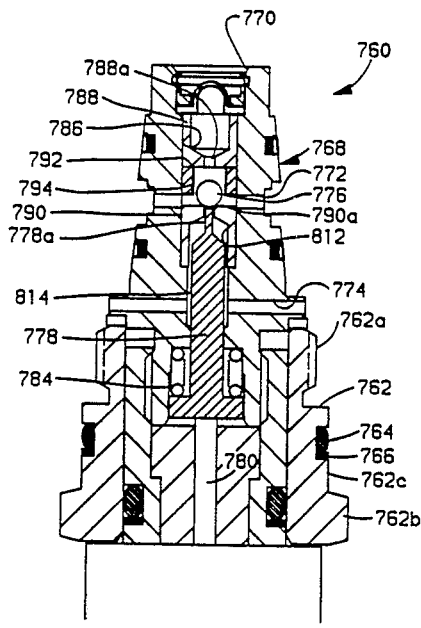
FIG. 8 is a fragmentary, sectional view of a solenoid operated three-way pilot valve forming part of the control system.

The flow rate selector valve 760 is preferably a solenoid operated pilot valve and in the preferred embodiment is the same type valve as the electrical trim control valves 56, 58 and the blocker control valve 140. Referring also to FIG. 8, the construction of a solenoid operated pilot valve that can be used for any of these valves is illustrated. The solenoid operated pilot valve includes a valve body 762 including a threaded segment 762a by which the cartridge valve is threadedly received by the manifold 10a (shown in FIG. 1), a hexagonal shaped segment 762b dimensioned to receive a suitable tool such as a wrench by which the cartridge is installed and a sealing segment 762c mounting an O-ring 764 and associated back-up ring 766 which inhibits leakage between the cartridge valve and intake manifold. The valve body 762 also includes a valving end 768 which defines an axial inlet 770, a first series of radial ports 772 and a second series of radial ports 774. A valving member comprising a ball 776 and an associated plunger 778 controls the fluid communication of the inlet 770 with the ports 772, 774. An operating pin 780 attached to a conventional armature (not shown) is operatively connected to the plunger 778. A solenoid coil assembly 782 (shown in FIG. 3) is energized to move the armature (not shown) in a conventional manner and hence produce movement in the operating pin 778. A biasing spring 784 urges the poppet 778 downwardly (as view in FIG. 8). The valve sleeve 768 of the valve includes an intermediate bore 786 in which a pair of confronting seat elements 788, 790 are press fitted. A spacer 792 is located intermediate the confronting seat members and defines passages 794 which communicate with the radial ports 772 formed in the sleeve 768. The seat members define respective seats 788a, 790a which are engageable by the ball 776. The plunger 778 includes an operating tip 778a which is adapted to drivingly engage the ball 776 and force it into engagement with the upper seat 788a (as viewed in FIG. 8) 788a when the solenoid is activated.

In FIG. 8, the valve is shown in its non-energized state. In this condition, the poppet spring maintains the plunger 778 in its lower position and the ball 776 sealingly engages the lower seat 790a. In this position, the inlet 770 communicates with the upper radial ports 772. Referring to FIG. 2, when the valves 56, 58 are unenergized (as shown) the passage 555 is fluidly connected to the pilot passage 330 (by the valve 56) and also fluidly connected to the passage 332 (by the valve 58). Referring to FIG. 3, in the de-energized condition, the valve 760 fluidly connects a pilot pressure passage 800 with a pilot control passage 802.

Referring also to FIG. 10, when the passages 800, 802 are in fluid communication, the spool 750 of the flow sensing valve is maintained in its upper position. It is maintained in this position because pilot pressure in the passage 500 which is conveyed to the pilot pressure passage 800 by an annulus 806 is communicated to the underside (as viewed in FIG. 10) of the spool 750 by the pilot operated three-way valve 760, the pilot passage 802 and a transfer passage 808 formed in the valve body. Pressure in the passage 500 is also communicated to an upper effective pressure area 810 on the spool 750 by diagonal bores 814. Since the area of the lower end of the spool is larger than the effective pressure area 810, the net fluid force developed on the spool 750 is in the upward direction and the spool 750 is then maintained in its upper position shown in FIG. 2.

Referring again to FIG. 8, when the solenoid is energized, the pin 780 is driven upwardly (as viewed in FIG. 8) by the armature (not shown). The operating pin 780 in turn drives the plunger 778 upwardly causing the plunger tip 778a to engage and drive the ball 776 into engagement with the upper seat 788a. In this position, the inlet 770 is isolated from the radial ports 772. Instead, the radial ports 772 are communicated with the lower radial ports 774 by way of the seat 790a, and internal bore 812 formed in the lower seat member 790 and a bore portion 814 formed in the valving section of the valve. In the system shown in FIG. 2, the radial ports 774 of any one of the pilot operated valves 56, 58, 140 or 760 are normally connected to a return line. In effect, with the ball 776 in the upper position, the radial ports 772 are vented to return pressure.

In particular and referring to FIG. 2 when the valve 56 is energized to drive the ball 776 upwardly, the pilot pressure line 330 is vented to the pilot return line 620 and as explained above, causes the spool 322 of the electrical trim valve 40 to be shifted upwardly since pressure in the pilot pressure line 332 continues to be applied whereas the pressure in the line 330 is vented. When the valve 58 is energized, the pilot pressure line 332 is vented to the return line 620 depressurizing the lower end of the electrical trim valve causing the spool 322 to shift downwardly.

In the case of the blocker control valve 140 (which is made to function as a normally open shut-off valve by connecting radial port 772 and 774 via manifold passage 611), when energized, the pilot pressure passage 562 is isolated from the return line 610 and as explained above, fluid flow from the conduit 502 is blocked and the spool 106 of the blocker valve is maintained in the upper position (shown in FIG. 2). When the valve 140 is de-energized, the pilot pressure passage 562 is connected to the return line 610.

When the flow rate control valve 750 is energized, the pilot pressure line 800 is isolated from the line 802 and the line 802 is connected to a branch return line 816 which in turn connects to the main return line 702. When the line 802 is depressurized, the pressure applied to the upper effective pressure area 810 by the fluid in the conduit 500 creates an unbalanced condition on the spool 715 and shifts it to its lower position shown in FIG. 10, exposing the second set of ports 756. With both sets of ports exposed, the system is placed in a "high rate" actuation mode in which the actuator connected to the motor ports 30, 32 is actuated at a higher rate.

According to the invention, the blocker valve 82, the flow rate sensing valve 748 and a servo pressure regulator 900 (see FIGS. 2 and 9) form a hydraulic feedback system for maintaining constant fluid flow to the actuator under varying load conditions. As explained above, the position of the blocker spool 106 is a function of the pressures in the passages 500, 502. When the pressures are equal, the spool 106 is maintained in its upper position illustrated in FIG. 2. When the passage 502 is "vented" the pressure drop that is developed across the orifice 506 urges the spool 106 downwardly. In the preferred embodiment, the spool 106 is not normally driven to its fully open position but instead its position is modulated so that the fluid flow rate to the actuator is maintained substantially constant. The modulation of the spool 106 is controlled by the servo pressure regulator 900.

When the system is activated to drive the actuator connected to the ports 30, 32, movement in the spool 106 is enabled when the blocker control valve 140 is de-energized so that the passages 562, 610 are communicated. As explained above, movement in the blocker spool 106 cannot occur until one of the trim valves 40, 50 (either the electric or manual valves but not both) is moved from its center position so that the passage 502 and 562 are communicated.

Assuming that the blocker control valve 140 is deenergized to communicate the passages 562, 610 and one of the trim valves is actuated so that the passages 502, 562 are communicated, the rate of "venting" of the passage 502 is now controlled by the servo pressure regulator 900. As seen in FIG. 3, the servo pressure regulator 900 monitors the pressure drop across the flow rate sensing valve 748. The rate at which fluid in the passage 610 is vented by the servo pressure regulator 900 to the return pressure line 104 via passage 902 is controlled by the sensed pressure differential across the flow rate selector 748. Fluid pressure on the downstream side of the flow selector 748 is communicated to the servo pressure regulator 900 by a return pressure sensing line 904 which is connected to the main return line 702 via passages 816, 620 and branch passage 906.

Figure 9:
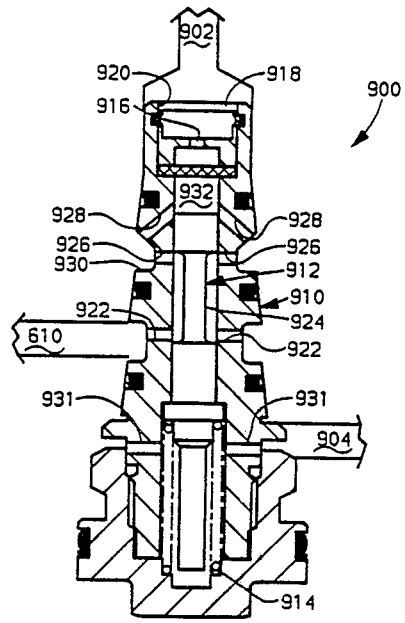
FIG. 9 is a sectional view of a servo-pressure regulator constructed in accordance with the preferred embodiment of the invention.

Referring in particular to FIG. 9 the servo pressure regulator 900 includes a housing 910 mounting a slidable spool 912 spring biased towards an upper position (shown in FIG. 9) by a spring 914. A fixed orifice 916 is mounted at the upper end of the housing (as viewed in FIG. 9) and communicates with the branch return line 902. A filter 918 is mounted at the upper end of the valve housing which defines an outlet 920. With the spool in the upper position shown in FIG. 9, pilot pressure in the line 610 is communicated to the branch return line 902 by way of radial ports 922 formed in the housing 910, a clearance region 924 defined by the spool 912, a second set of radial ports 926 which are communicated with diagonal ports 928 by an annular clearance 930 defined by the body 910. The diagonal bores 928 communicate fluid to a central throughbore 932 which also slidably supports the spool 912. The fluid then flows through the orifice element 916 into the passage 902. Fluid pressure in the branch sensing line 904 is communicated to the lower end of the spool 912 by radial bores 931.

In normal operation, the combination of the spring force applied by the spring 914 and fluid pressure in the branch sensing line 904, applied to the lower end of the spool 912 (as viewed in FIG. 9) maintains the spool in the upper position shown in FIG. 9. However, should higher than normal flow rate occur in the line 104, pressure in the passage 902 will increase applying a fluid generated downwardly directed force on the spool 912. When sufficient pressure occurs in the passage 902, the force developed at the upper end of the spool 912 will counter the force applied by the spring 914 and the pressure in the line 904 and begin moving the spool downwardly thus throttling the flow of fluid from the passage 610 to the return passage 902. Referring to FIGS. 2 and 3, when fluid in the passage 610 is throttled, the flow rate in the passage 502 is also throttled reducing the net fluid force developed across the orifice 506, allowing the spool 106a to move upwardly whereby the ports 112, 114 are also throttled.

According to a feature of this system, the orifice 916 functions as a damping orifice and provides a leading characteristic. The orifice senses and prevents a potential overshoot condition before it actually occurs. The blocker valve spool 106 cannot move toward the fully opened position (the position at which the ports 112, 114 are fully exposed by the clearance regions 146, 148) unless there is an increase in pilot flow across the blocker valve orifice 506. Therefore, whenever the pilot flow exceeds a predetermined value it can be assumed that the blocker valve spool 106 is being driven toward an overshoot position. This can be prevented by sizing the damping orifice 916 so that it will generate a high fluid back pressure in the bore 932 whenever the pilot flow becomes excessive. This back pressure will generate a force on the spool 912 and urge the spool towards a lower position (i.e., a position at which the radial ports 930 are partially or fully blocked) thereby reducing the pilot flow before the blocker valve spool 106 can actually move to an overshoot position.

Returning to FIG. 6, the construction of the pressure divider 550 (which supplies a controlled pilot pressure equal to one-half source pressure) is illustrated. The divider 550 includes a valve housing including a valving section 550a threadedly connected to a mounting section 550b. The mounting section 550b includes a threaded segment 952 by which the divider is mounted to the manifold 10a and a seal arrangement 954 for sealing the mounting of the valve.

The valving section 550a slidably mounts a spool 956 in a multi-stepped bore 956 having a large diameter, upper section 956a and a small diameter lower section 956b. The upper end 956a (as viewed in FIG. 6) of the spool 956 is slidably supported by a narrow diameter segment 958a of a multistep bore. The lower end of the spool 956b which in the preferred embodiment has a cross-sectional area one-half that of the cross-section of the upper end 956a of the spool 956 is slidably received in a sleeve 959 which defines a closed bore 960. According to the invention, the sleeve 959 is self-aligning and in effect "floats" on the lower end 956b of the spool 956. The lower end of the sleeve 959 (as viewed in FIG. 6) abuts on inside surface 957 of a valve cap 961. Once assembled, the sleeve 959 is captured between the spool 956 and cap 961.

Source pressure $P_s$ in the source pressure line 84 is communicated to a control pressure supply passage 554 by way of a branch passage 552, radial ports 962 formed in the valving section 550a of the pressure divider, radial ports 964 formed in the spool and an end bore 966 defined by the spool. Source pressure is also communicated from the branch passage 552 to the end bore 960 defined by the sleeve 959 by way of the ports 962, a diagonal bore 968 an annular clearance region 970 defined by the upper section 956a of the spool, a radial port 972 and an axial end bore 974, all formed in the lower end 956b of the spool. As indicated above, the cross-sectional area of the lower section 956b of the spool is substantially one-half the cross-sectional area of the upper end 956a of the spool. As a result, when the control pressure in the passage 559 exceeds substantially one-half source pressure, the biasing force exerted at the lower end of the spool will be overcome since the effective pressure area is one-half the effective pressure area of the upper end of the spool. The spool will move downwardly and throttle the flow from the ports 962 and a control pressure equal to substantially one-half source pressure will be maintained. It should be noted that other forms of control and regulator valves may be used. In fact, a standard pressure regulator valve may be used in lieu of the disclosed pressure divider.

According to another feature of the invention, the manual trim valve can be used to block all fluid flow to the actuator 14 should a failure in one of the other components occur. Referring in particular to FIG. 11, when the spool 210 of the manual trim valve is moved towards the upper or lower shifted positions, it passes through a "all ports blocked" position, illustrated in FIG. 11. In this position, the pressure and return passages 142, 144 are isolated from each other and from the associated supply passages 250, 450, 456, 450a and 252. In addition, the control passage 502 is isolated from the return passage 562. The intermediate control passages 560, 564 are isolated from each other and from the passages 502, 562. With the disclosed manual trim valve construction, should a failure in the system occur in which fluid pressure is continually supplied to one of the actuator ports, the pilot may move the manual trim valve to the intermediate position shown in FIG. 11 and block all flow to and from the actuator as well as to and from the blocker control circuit.

According to another feature of the invention, the end cap region of the blocker valve 82 and both ends of the manual trim valve spool 210 are vented to the main return line 702 via the branch return line 701 and additional branch return lines 980, 982. In the case of the blocker valve, normally only the lower end of the blocker spool 106 is exposed to fluid pressure. A seal 984 carried by a blocker valve end cap member 986 inhibits fluid leakage from the blocker spool bore 106a into the end cap. Should leakage occur, however, this leakage is vented to the return line 702 by the branch line 982 which communicates with the end cap region by way of slot 986. Similarly, the end of the manual trim valve spool 210 is vented to the return line by way of the branch return passage 980 and radial bores 990 formed in the cap 224. The bores 990 are smaller in size than the branch passage and as a result, the vent is "restricted". Redundant seals 992, 994 and 996 and 998 are used at the upper and lower ends of the valve sleeve 220 of the trim valve to prevent external leakage and to reduce the possibility of pressure build-up against the ends of the spool 210. These redundant seals also ensure the adequate lubrication of the mechanical centering components as well as the lever to spool interconnection indicated generally by the reference character 70. The redundant seals further inhibit the build up of pressure against either end of the spool in the event of a seal failure that might be greater than can be accommodated by the restricted return path. The space between the seals is vented overboard to relieve any leakage by passages 999a, 999b. Each of these vent lines is protected against external contamination by a filter screen 1000.

The electrical trim valve 40 is also vented. In particular, a region 1002 between the upper end of the spool 322 and the bottom of the lower spring seat 250a is connected to a branch return line 1004 by way of radial bores 1006 formed in the sleeve 310. The branch line 1004 communicates with the branch return line 980 by way of an annulus 1008 formed in the sleeve 220 of the manual trim valve 50.

A case drain port 1010 is connected to the branch return passage 1004 by a passage 1012. Referring to FIG. 1, the case drain port 1010 is connected in a conventional manner to the actuator case by a drain line indicated in phantom by the reference character 1014.

It should be noted here that the rate of actuation for a positive displacement actuator is strictly a function of the fluid flow rate through the actuator. Therefore, by maintaining a constant flow rate across the flow rate sensing valve 748, a constant actuation rate for the actuator will be maintained regardless of load.

With the disclosed arrangement, both input fluid as well as return fluid from the actuator is throttled by the blocker valve 82 to compensate for load changes. As an example, under light load, the return pressure in the passage 144 will be high since very little pressure drop will occur across the actuator. The return pressure in the passage 144 will in turn be communicated to the passage 104 by way of the blocker valve ports 114, 110 and clearance region 148. The return fluid flow in the passage 104 will produce a pressure drop across the flow rate sensing valve 748 as it travels to the passage 702. This pressure drop is sensed by the servo pressure control valve 900 which in turn adjusts the rate at which fluid pressure is vented from passage 610 which, as explained above, ultimately communicates with the passage 502 via one of the trim valves 40, 50 and the blocker control valve 82.

For high return pressures, the servo pressure regulator 900 decreases the rate at which fluid is vented and hence, the pressure in the passage 502 will increase, thereby decreasing the pressure drop across the orifice 506. The decrease in the pressure drop will decrease the biasing force on the spool 106 tending to drive it downwardly and hence the spool will rise so that the ports 114, 112 will be partially blocked by the spool as illustrated in FIG. 4. As a result, the fluid being conveyed to the actuator via the passage 142 will be throttled. Return fluid flow in the passage 144 will also be throttled.

If the load changes, the servo pressure regulator 900 will readjust the venting of the passage 502 so that the position of the blocker spool 106 will change to compensate for the load variation. With the disclosed arrangement, the spool 106 will even control an overhauling load in which the actuator is being driven by an external force and in effect is acting as a pump. Under overhauling conditions, the spool 106 will rise upwardly as the fluid pressure in the passage 502 is increased by the servo pressure regulator 900 and will throttle flow to and from the actuator in order to prevent over running.

Although the invention has been described with a certain degree of particularity it should be understood that those skilled in the art may make various changes to it without departing from the spirit or scope of the invention as hereinafter claimed.

I claim:

1. For a fluid pressure operated actuator having at least two pressure input ports, the application of pressure to said ports determining the direction of motion, a control system comprising:
  (a) a source of pressurized fluid having a source pressure;
  (b) pressure controlling means for providing a controlled fluid pressure at a pressure level that is a predetermined level below said source pressure;
  (c) direction control means operative to selectively communicate said source of pressurized fluid to one of said actuator input ports while communicating the other of said ports with a return pressure line;
  (d) blocking means operative to interrupt communication of said source with said direction control means and being further operative to communicate said controlled pressure to both of said actuator input ports concurrently during actuator idle periods.

2. The control system of claim 1 wherein said blocking means is operative to throttle fluid flow to and from said actuator when said actuator is being energized, as a function of load.

3. The control system of claim 2 wherein said blocking means includes a blocker valve and a servo pressure regulator which is operative to position a valve element within said blocker valve in response to sensed changes in the fluid flow rate of fluid returning to said return pressure line.

4. The control system of claim 3 wherein said direction control means comprises redundant manually operated and electrically operated trim valves.

5. A control system for a fluid pressure operated actuator used to control the position of a control surface on an aircraft, comprising:
  (a) a source of pressurized fluid;
  (b) pressure controlling means for providing a controlled fluid pressure at a pressure level substantially one-half a pressure level of said source;
  (c) blocker means operative to maintain said control pressure level across said actuator during inactive periods;
  (d) direction control means for controlling the direction of actuation of said actuator;
  (e) blocker control means operative to cause said blocker means to communicate said source of pressurized fluid and a return pressure line with said direction control means;
  (f) said direction control means selectively operable to communicate one of said actuator ports with said source and the other of said ports with said return line; and,
  (g) actuation rate control means for maintaining a substantially constant fluid flow rate to said actuator, said rate control means including a servo pressure regulator for controlling a position of a fluid flow rate control member in said blocker means whereby fluid flow from said source and to said return line is controlled.

6. The control system of claim 5 wherein said servo pressure regulator monitors a pressure drop across an orifice disposed in said return line and adjusts the position of said blocker valve element to compensate for sensed changes in the fluid flow rate across said orifice.

7. The apparatus of claim 6 wherein said orifice is adjustable whereby at least two different actuator flow rates can be controlled.

8. A blocker valve for controlling the application of a source of pressurized fluid to, and a return of pressurized fluid from, an actuator, comprising:
  (a) a housing defining a pressure port, a return pressure port and a pair of output ports;
  (b) a spool slidably mounted within said housing for controlling the communication of said pressure and return ports with said output ports;
  (c) said housing further defining a control pressure input port and a control pressure output port;
  (d) structure defining an orifice disposed intermediate said control pressure input and output ports and operatively connected to said spool such that fluid forces generated across said orifice by a fluid at said controlled pressure flowing from said input port to said output port urges said spool towards a position at which said pressure port is at least partially communicated with one of said output ports and said return port is at least partially communicated with said other output port.

9. The blocker valve of claim 8 wherein said spool defines a cavity communicating with said control pressure input port and further includes means for fluidly communicating said cavity with said output ports when said spool is in a position at which said return port is not in fluid communication with said other output port.

10. The apparatus of claim 9 wherein said orifice is mounted at one end of said spool, one side of said orifice communicating with said cavity, the other side of said spool communicating with said control pressure output port.

11. A method for controlling the trim position of a horizontal stabilizer on an aircraft, comprising the steps of:
  (a) providing a control pressure at a pressure level less than a source of pressurized fluid;
  (b) at least partially communicating said source of pressurized fluid with an actuator attached to said stabilizer while concurrently communicating a return port from said actuator to a return pressure line;
  (c) monitoring the flow of return fluid from said actuator and adjusting said control pressure in response to the sensed return flow whereby the communication of source pressure to said actuator is adjusted to compensate for changes in load.

12. The method of claim 11 further comprising the step of communicating said control pressure to said actuator when said actuator is idle.

13. The method of claim 12 wherein a flow of control pressure is conveyed across an orifice forming part of a blocker valve such that a position of a valve element in said blocker valve is a function of the rate of control pressure flow.

14. A control system for controlling movement in an actuator attached to a control surface on an aircraft, comprising:
  (a) a source of pressurized fluid;
  (b) a source of control pressure having a pressure level a predetermined level below said source of pressurized fluid;
  (c) a blocker valve defining a pressure input port communicating with said source of pressurized fluid, a return port communicating with a return pressure line and a pair of actuator supply ports;
  (d) a valve element forming part of said blocker valve for controlling the communication of pressurized fluid from said pressure input port with one of said actuator supply ports and for controlling the communication of said source of control pressure with both of said actuator supply ports;

(e) said element including means for generating a biasing force on said spool as a function of the rate of flow of said control pressure;

(f) said element movable from an off position at which said pressure input port and return pressure port are isolated from said actuator supply ports and said actuator supply ports are communicated with said control pressure, to an on position at which said pressure input port is at least partially communicated with said one actuator supply port and said return pressure port is at least partially communicated with the other actuator supply port;

(g) means communicating said actuator with said actuator supply ports.

15. The system of claim 14 wherein said means for communicating comprises a manual trim valve which controls the communication of pressurized fluid to said actuator and the return flow of pressurized fluid from said actuator to determine direction of actuation of said actuator.

16. The apparatus of claim 15 wherein said means for communicating further includes an electrically controlled trim valve.

17. The apparatus of claim 16 further including a servo pressure regulator which monitors the pressure at said return port on said blocker valve and adjusts the flow rate of said control pressure whereby movement in said blocker valve element is controlled.

18. The control system of claim 17 further including a flow rate selector valve for adjusting the rate at which said actuator is energized.

19. The system of claim 18 further comprising a surge suppressor for communicating source pressure with said return pressure line when a rate of change in said source pressure above a predetermined level is sensed.

20. The apparatus of claim 19 wherein said surge suppressor includes a chamber containing a compressible fluid and includes an orifice communicating source pressure with said chamber such that a rate of increase of said source pressure above a predetermined level generates a opening force on a valve element forming part of said surge suppressor causing said element to at least partially communicate an inlet with an outlet that communicates with a return pressure line.

21. The apparatus of claim 15 wherein said manual trim valve includes an all ports blocked position at which all fluid communication between said blocker valve and said actuator is terminated.

* * * * *